US009097557B2

(12) United States Patent
Matsumoto

(10) Patent No.: US 9,097,557 B2
(45) Date of Patent: Aug. 4, 2015

(54) POSITION DETECTION DEVICE, TWO-DIMENSIONAL POSITION MEASURING APPARATUS, OPTICAL APPARATUS AND POSITION DETECTION METHOD

(75) Inventor: Tsuyoshi Matsumoto, Shinagawa-ku (JP)

(73) Assignee: NIKON CORPORATION, Tokyo (JP)

( * ) Notice: Subject to any disclaimer, the term of this patent is extended or adjusted under 35 U.S.C. 154(b) by 161 days.

(21) Appl. No.: 13/231,047

(22) Filed: Sep. 13, 2011

(65) Prior Publication Data

US 2011/0316528 A1    Dec. 29, 2011

Related U.S. Application Data

(63) Continuation of application No. 12/063,802, filed as application No. PCT/JP2006/321252 on Oct. 25, 2006, now Pat. No. 8,040,126.

(30) Foreign Application Priority Data

Oct. 25, 2005 (JP) ................................. 2005-310307

(51) Int. Cl.
*G01B 7/14* (2006.01)
*G01R 33/07* (2006.01)
*G01R 33/09* (2006.01)
*G01D 5/14* (2006.01)
*G03B 5/00* (2006.01)

(52) U.S. Cl.
CPC . *G01D 5/142* (2013.01); *G03B 5/00* (2013.01)

(58) Field of Classification Search
USPC .................................................. 324/207.24
See application file for complete search history.

(56) References Cited

U.S. PATENT DOCUMENTS

| 3,777,273 | A | * | 12/1973 | Baba et al. ..................... 335/236 |
| 6,018,241 | A | | 1/2000 | White et al. |
| 6,456,444 | B1 | * | 9/2002 | Yumiki et al. ................. 359/696 |
| 6,618,211 | B2 | * | 9/2003 | Yumiki et al. ................. 359/696 |
| 7,088,095 | B1 | | 8/2006 | Busch |
| 7,496,288 | B2 | * | 2/2009 | Seo ................................. 396/55 |

(Continued)

FOREIGN PATENT DOCUMENTS

| JP | 02-138820 | 5/1990 |
| JP | 2000-155005 | 6/2000 |

(Continued)

OTHER PUBLICATIONS

Korean Office Action for corresponding KR Application No. 2007-7027929, Feb. 28, 2013.
Korean Office Action for corresponding KR Application No. 10-2007-7027929, Sep. 27, 2013.

*Primary Examiner* — Bot Ledynh
(74) *Attorney, Agent, or Firm* — Mori & Ward, LLP

(57) ABSTRACT

A position detection device includes a magnet and a magnetic detector. The magnet includes a first pole, a second pole, a third pole and a fourth pole. The first pole and the second pole are arranged spaced apart from each other and have a same magnetic polarity. The third pole and the fourth pole are arranged spaced apart from each other and have a magnetic polarity different from the magnetic polarity of the first pole and the second pole. The first pole faces the third pole. The second pole faces the fourth pole. The magnetic detector is configured to detect magnetism of the first pole, the second pole, the third pole, and the fourth pole.

7 Claims, 19 Drawing Sheets

(56) References Cited

U.S. PATENT DOCUMENTS

| | | |
|---|---|---|
| 7,777,482 B2 * | 8/2010 | Munz et al. ............... 324/207.2 |
| 2003/0094941 A1 * | 5/2003 | Mizutani et al. ........... 324/207.2 |
| 2005/0134257 A1 | 6/2005 | Etherington et al. |
| 2005/0184727 A1 * | 8/2005 | Kurita et al. ............ 324/207.21 |

FOREIGN PATENT DOCUMENTS

| | | |
|---|---|---|
| JP | 2001-59745 | 3/2001 |
| JP | 2002-229090 | 8/2002 |
| JP | 2006-250857 | 9/2006 |

\* cited by examiner

FIG.3
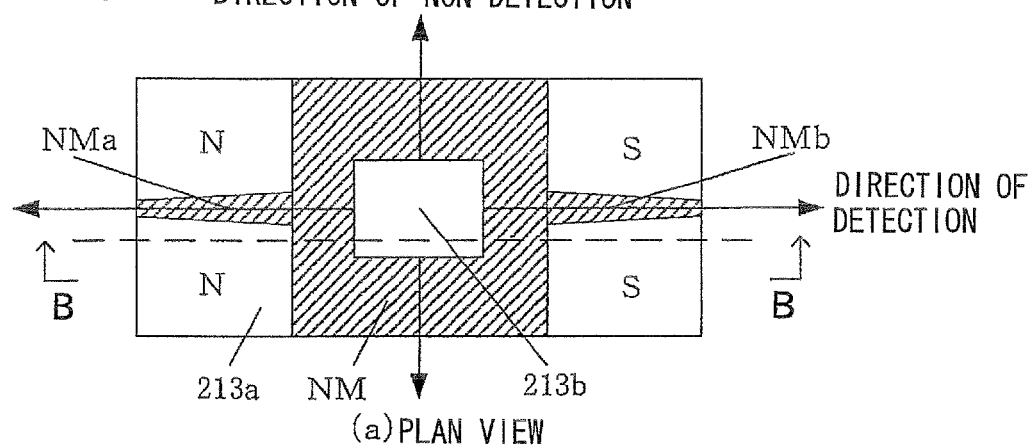
(a) PLAN VIEW
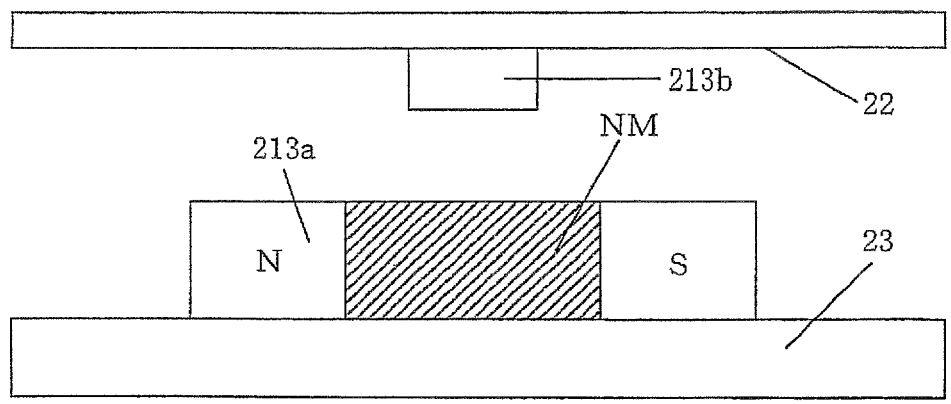
(b) B-B ARROW VIEW

FIG.9
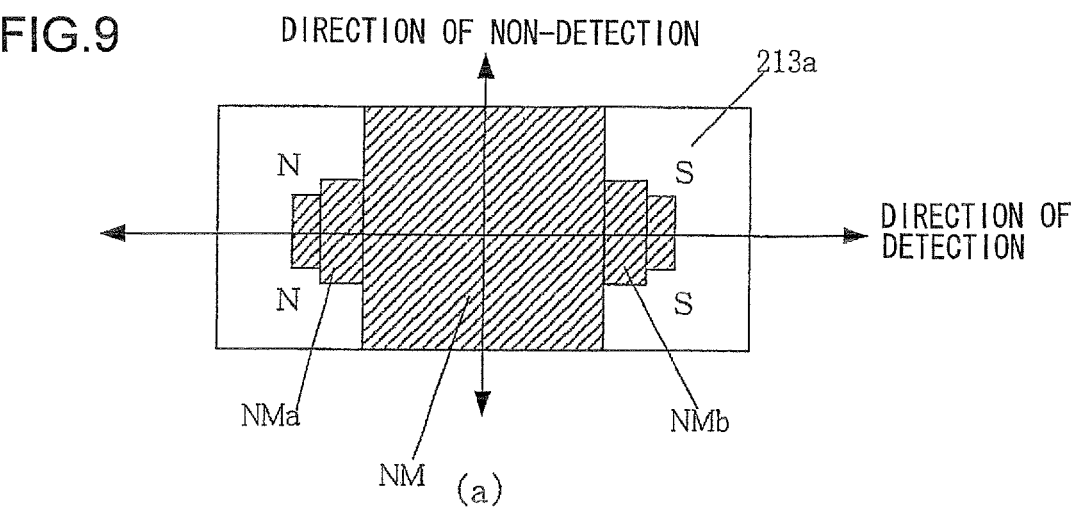
(a)
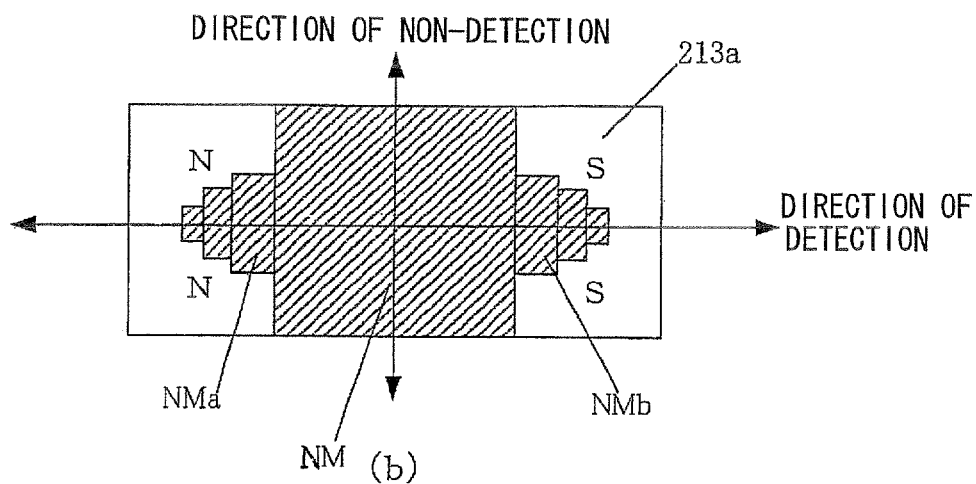
(b)

FIG.12
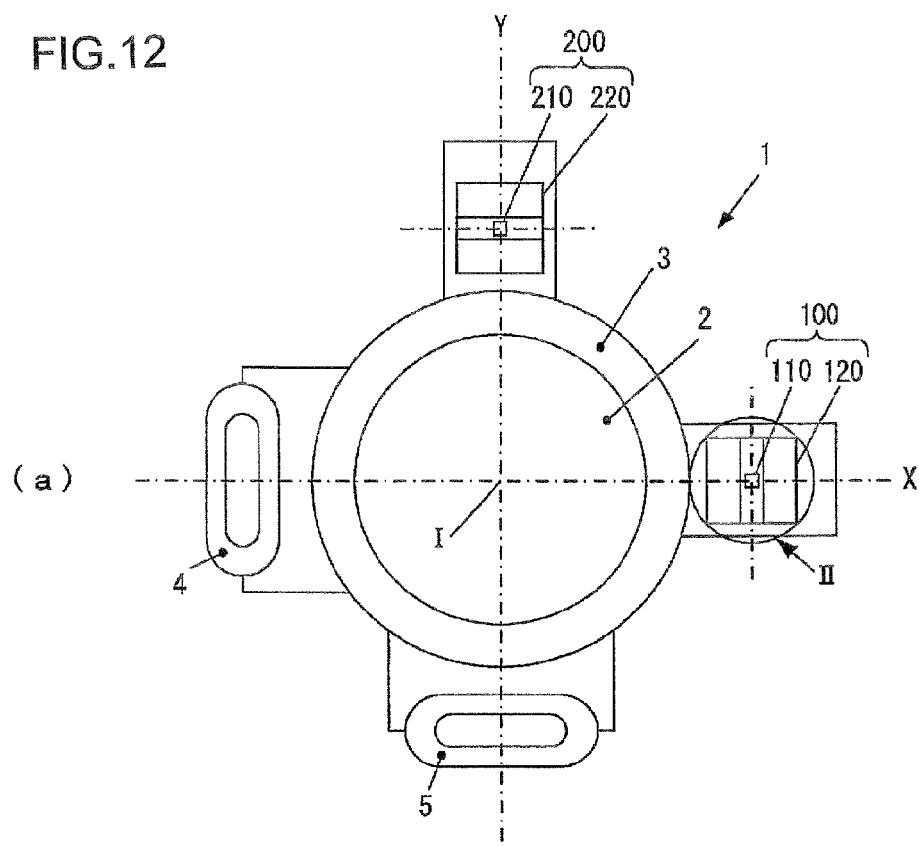
(a)
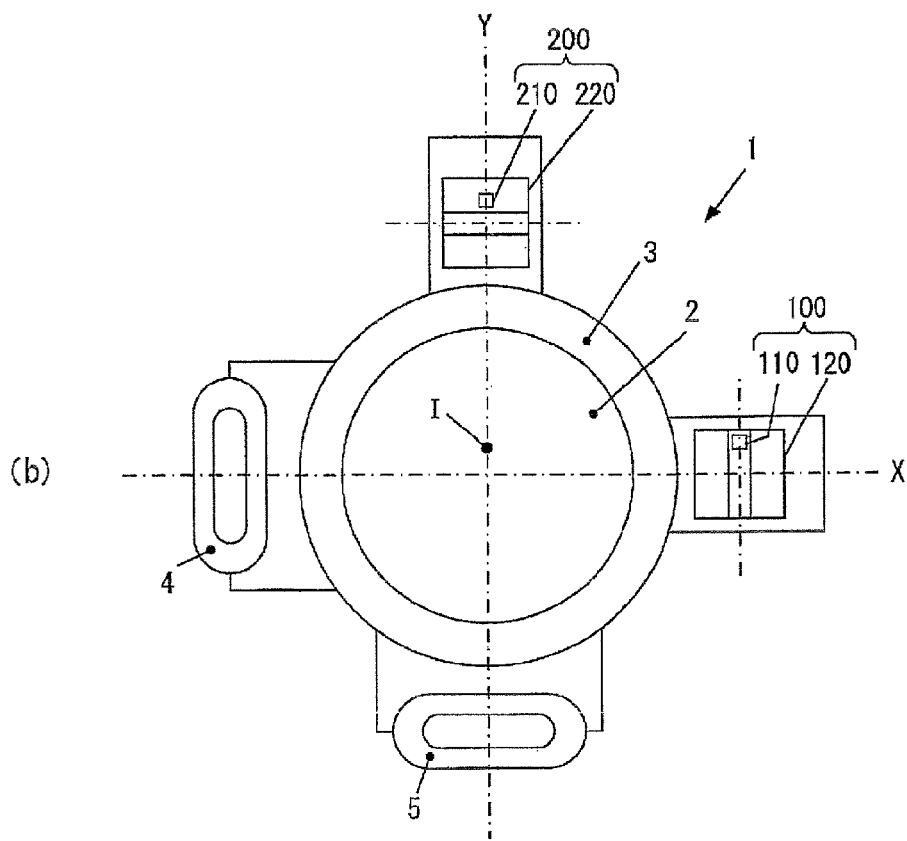
(b)

(a)

(b)

FIG.19
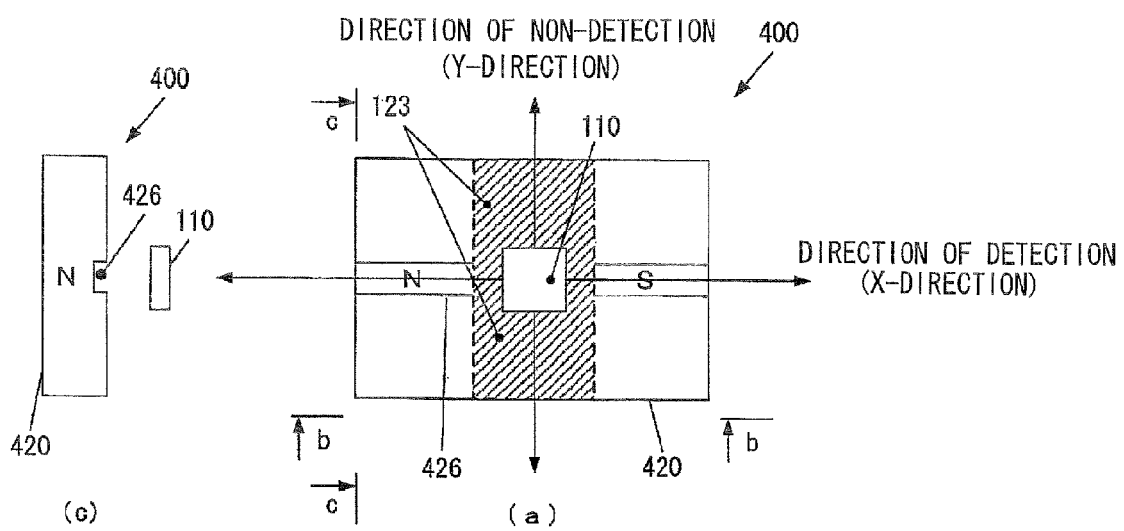
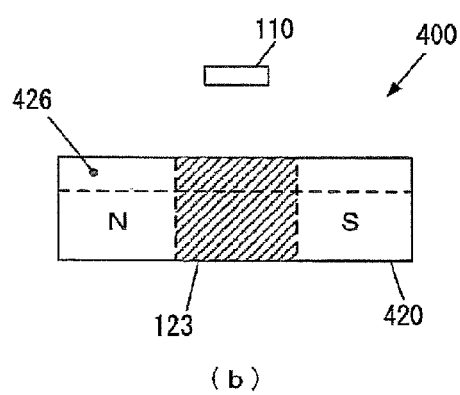

POSITION DETECTION DEVICE, TWO-DIMENSIONAL POSITION MEASURING APPARATUS, OPTICAL APPARATUS AND POSITION DETECTION METHOD

CROSS-REFERENCE TO RELATED APPLICATIONS

The present application is a continuation application of the U.S. patent application Ser. No. 12/063,802 filed on Feb. 14, 2008, which in turn is a national stage application of International Application No. PCT/JP2006/321252, filed on Oct. 25, 2006, which claims priority under 35 U.S.C. §119 to Japanese Patent Application No. 2005-310307, filed on Oct. 25, 2005. The contents of these applications are incorporated herein by reference in their entirety.

BACKGROUND OF THE INVENTION

1. Field of the Invention

The present invention relates to a position detection device, a two-dimensional position measuring apparatus, an optical apparatus and a position detection method.

2. Discussion of the Background

A position detection device that includes a magnet and a magnetic sensor is known. An image blur correction apparatus that includes such a position detection device is disclosed in Japanese Laid-open Patent Publication No. 2002-229090.

However, the above-mentioned apparatus has a problem that a variation of an error component in a detection signal with respect to a relative displacement in a direction perpendicular to the direction of position detection is considerable for each position in the direction of position detection, which would result in a decrease in precision of position detection.

SUMMARY OF THE INVENTION

According to one aspect of the present invention, a position detection device includes a magnet and a magnetic detector. The magnet includes a first pole, a second pole, a third pole and a fourth pole. The first pole and the second pole are arranged spaced apart from each other and have a same magnetic polarity. The third pole and the fourth pole are arranged spaced apart from each other and have a magnetic polarity different from the magnetic polarity of the first pole and the second pole. The first pole faces the third pole. The second pole faces the fourth pole. The magnetic detector is configured to detect magnetism of the first pole, the second pole, the third pole, and the fourth pole.

According to another aspect of the present invention, a two-dimensional position measuring apparatus includes the two position detection devices. The two position detection devices are arranged such that a direction of detection of position by one of the two position detection devices and a direction of detection of position by another of the two position detection devices are perpendicular to each other.

According to further aspect of the present invention, an optical apparatus includes the two-dimensional position measuring apparatus and a controller. The controller is configured to perform control using results of measurement by the two-dimensional position measuring apparatus.

According to the other aspect of the present invention, a position detection device includes a magnet and a magnetic detector. The magnet includes a first magnetism generator, a second magnetism generator and a low magnetism section. The first magnetism generator is provided on one end side along a predetermined direction to generate magnetism. The second magnetism generator is provided on another end side along the predetermined direction to generate magnetism. The polarity of the magnetism by the second magnetism generator is different from a polarity of the magnetism generated by the first magnetism generator. The low magnetism section is formed in the first magnetism generator and the second magnetism generator along the predetermined direction to generate magnetism lower than those of the first magnetism generator and the second magnetism generator. The magnetic detector is movable relative to the magnet along the predetermined direction and configured to detect the magnetism generated by the first magnetism generator and the second magnetism generator.

According to further aspect of the present invention, a position detection method includes: generating magnetism by a first magnetism generator provided on one end side along a direction of detection; generating magnetism by a second magnetism generator provided on another end side along the direction of detection, a polarity of the magnetism by the second magnetism generator being different from a polarity of the magnetism generated by the first magnetism generator; decreasing the magnetism generated by the first magnetism generator and the second magnetism generator by a low magnetism section formed in the first magnetism generator and the second magnetism generator along the predetermined direction; and moving the magnetic detector relative to the first magnetism generator and the second magnetism generator to detect the magnetism generated by the first magnetism generator and the second magnetism generator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 3(a) and 3(b) show a plan view and a view on arrows B-B of a position detection device according to the first embodiment;

FIGS. 9(a) and 9(b) show modifications of the position detection device according to the first embodiment, with FIG. 9(a) illustrating the modification in which each pole includes two rectangles while FIG. 9(b) illustrating the modification in which each pole includes 3 rectangles;

FIGS. 12(a) and 12(b) show schematic diagrams illustrating a configuration of a vibration compensation apparatus including the position detection device according to a second embodiment of the present invention;

FIGS. 19(a)-19(c) show a plan view, a b-b arrow view, and a c-c arrow view of a position detection device according to a fourth embodiment of the present invention.

DESCRIPTION OF THE EMBODIMENTS

Figure 1:
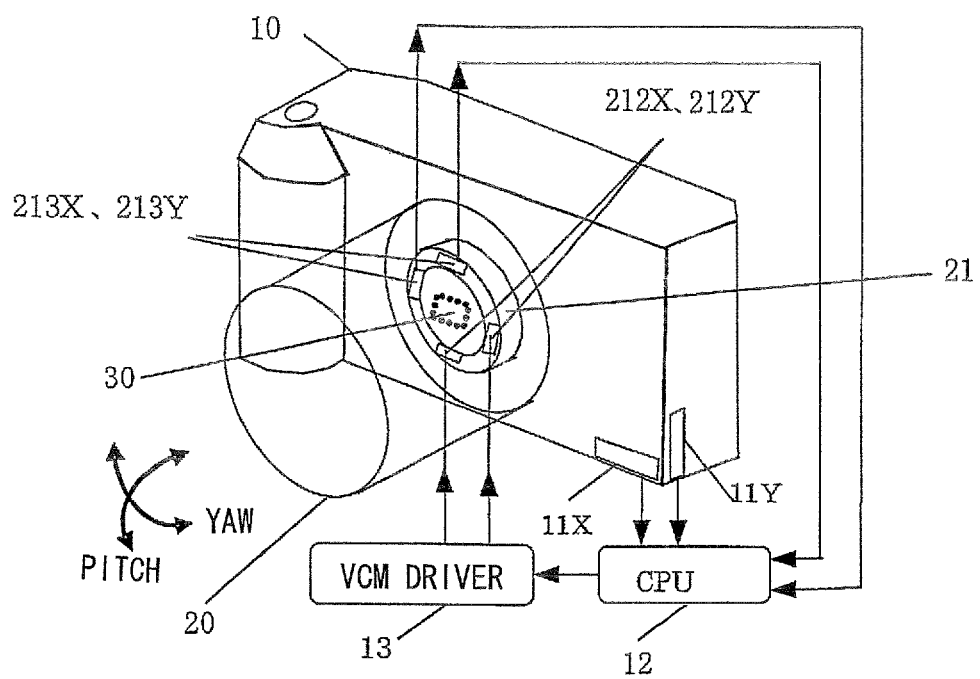
FIG. 1 is a schematic diagram of a camera with a vibration compensation function according to a first embodiment of the present invention.
Figure 2:
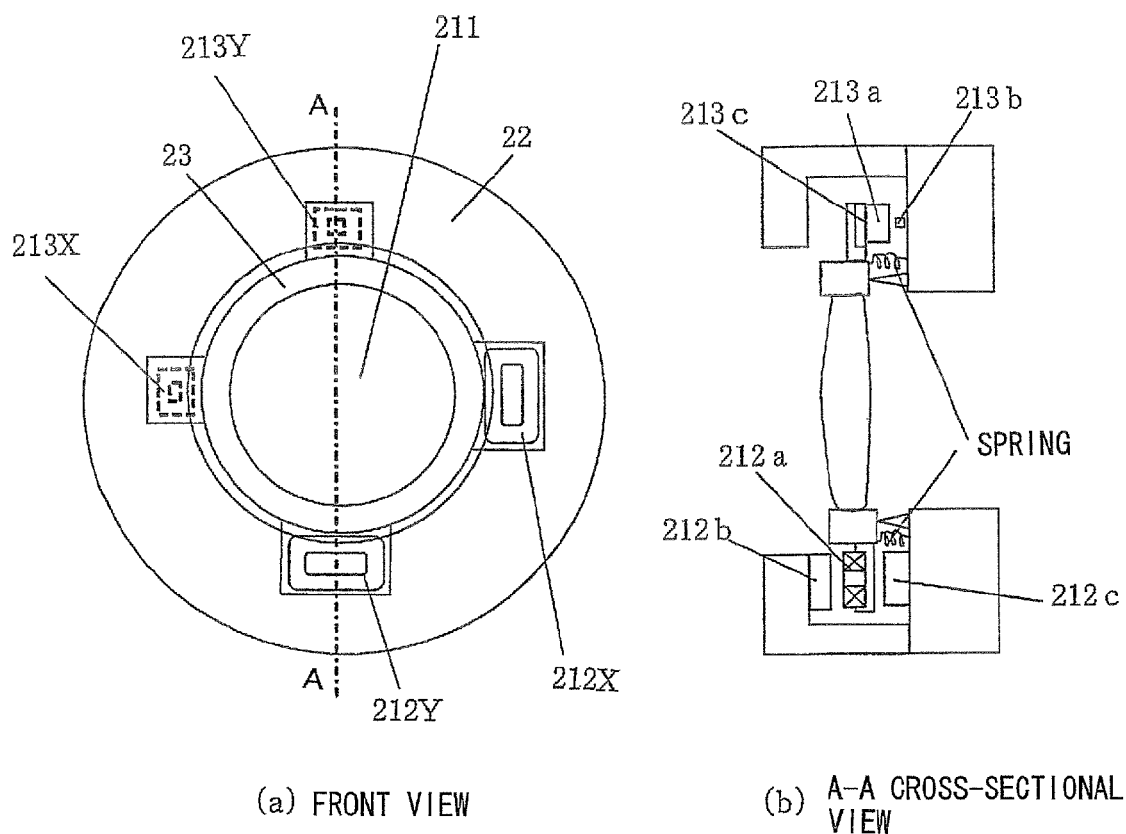
FIGS. 2(a) and 2(b) show a front view and an A-A cross-sectional view of a vibration compensation device mounted on a camera.

The embodiments will now be described with reference to the accompanying drawings, wherein like reference numerals designate corresponding or identical elements throughout the various drawings.

First Embodiment

Referring to FIGS. 1 to 6, a position detection device according to a first embodiment of the present invention is explained in detail. In the first embodiment, explanation is made on an example in which a detection position device is applied to a camera with a vibration compensation function. FIG. 1 is a schematic diagram of a camera with a vibration compensation function according to the first embodiment. FIGS. 2(a) and 2(b) show a front view and an A-A cross-sectional view, respectively, of a vibration compensation device mounted on a camera.

AS shown in FIG. 1, the camera includes a camera body 10, an interchangeable lens barrel 20 capable of being detachably attached to the camera body 10. The camera body 10 is provided with an image sensor 30, such as a CCD. On the image sensor 30 is formed an image of a subject through a photographic optical system (not shown) that is contained in the lens barrel 20. In the lens barrel 20, there is provided a vibration compensation device 21. The vibration compensation device 21 is to optically compensate image blur caused by pitching (vertical vibration) and yawing (horizontal vibration) occurring in the camera upon photographing (hereinafter, referred to as vibration of camera). For this purpose, the camera body 10 is provided with angular speed sensors (gyroscopes) 11X and 11Y that detect vibration of the camera.

As shown in FIGS. 2(a) and 2(b) in detail, the vibration compensation device 21 includes a correction lens 211, compensation actuators 212X and 212Y (hereinafter, collectively 212) that two-dimensionally move the correction lens 211 in response to the vibration of the camera detected by the gyroscopes 11X and 11Y, and position detection devices 213X and 213Y (hereinafter, collectively 213) that detect the position of the correction lens 211 moved by the compensation actuator 212 in two directions perpendicular to each other.

The compensation actuator 212X, as shown in FIG. 2(b), is a voice coil motor that includes a coil 212a, a magnet 212b, and a yoke 212c. The position detection device 213X is a magnetic sensor that includes a magnet 213a, a magnetic detection element 213b, and a yoke 213c and detects a position in the direction X of the correction lens 211, that is, in the horizontal direction when the camera is placed in a lateral position as shown in FIG. 1. Note that the constructions of the compensation actuator 212Y and the position detection device 213Y are the same as those of the compensation actuators 212X and the position detection device 213X. The position detection device 213Y detects the Y direction of the correction lens 211, that is, a position in the vertical direction when the camera is placed in a lateral position as shown in FIG. 1. The directions X and Y are perpendicular to each other and also are perpendicular to an optical axis of the lens barrel 20.

As shown in FIG. 1, vibration detection signals from the gyroscopes 11X and 11Y and a position detection signal from the position detection device 213 are input to a CPU 12 provided in the camera body 10. The CPU 12 drives the compensation actuator 212 through a VCM driver 13 so that the vibration can be compensated.

Referring to FIGS. 3(a) and 3(b), explanation is made on the position detection device 213. Each position detection device 213 includes a stationary member 22 that is fixed to the lens barrel 20 and a movable member 23 that is connected to the blur correction lens 211 and is movable. FIG. 3(a) is a plan view in which the stationary member 22 is eliminated for facilitating visualization. FIG. 3(b) is a B-B arrow view. The position detection device 213Y is arranged such that the direction of detection shown in FIG. 3(a) coincides with the Y direction. The position detection device 213X is arranged such that the direction of detection coincides with the X direction.

To the movable member 23 is fixed the magnet 213a whereas to the stationary member 22 is fixed the magnetic detection element 213b that detects magnetism in the vertical direction generated by the magnet 213a in opposition to the magnet 213a. The clearance (distance in the vertical direction) between the magnetic detection element 213b and the magnet 213a is kept constant and when the magnetic detection element moves relatively to the magnet 213a, the distance does not change.

As shown in FIGS. 3(a) and 3(b), the magnet 213a has an N pole disposed on one end thereof in the direction of detection of position and an S pole on the other end. Between the N and S poles, there is arranged a nonmagnetic region NM. The nonmagnetic region NM is configured such that the detection signal from the magnetic detection element 213b is substantially linear in the direction of detection of position. The N and S poles of the magnet 213a are provided with nonmagnetic regions NMa and NMb, respectively, substantially in the center thereof in the direction of non-detection. The nonmagnetic regions NMa and NMb, as shown in FIG. 3(a), are each configured to be approximately of a trapezoidal form, with the width of each of the nonmagnetic regions NMa and NMb growing continuously narrower depending on the distance from the center of the magnet 213a as distanced from the nonmagnetic region NM. Note that the direction of detection of position means a direction of movement when the magnetic detection element 213b and the magnet 213a are in relative movement along an ideal route in design of detection of position. The direction of non-detection means a direction perpendicular to the direction of detection of position.

Figure 4:
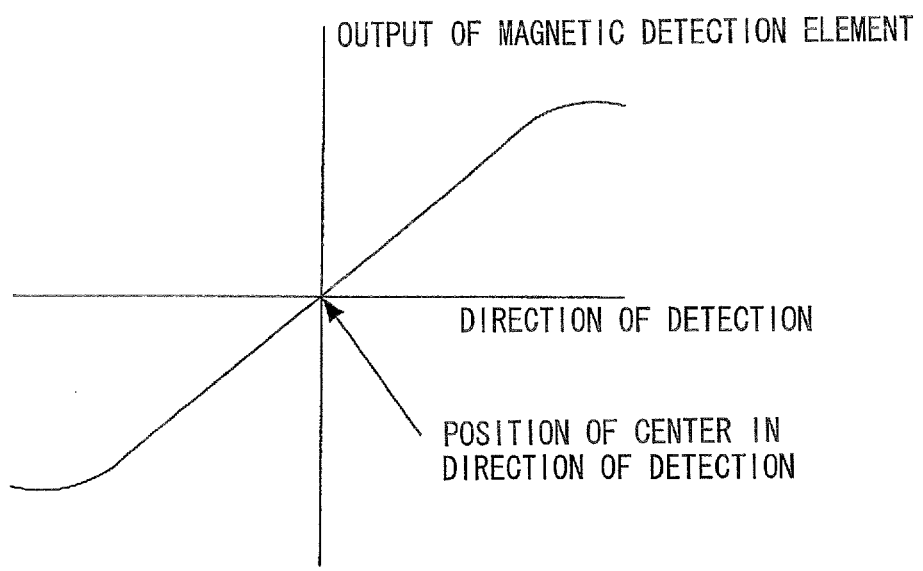
FIG. 4 is a graph illustrating output characteristics of a magnetic detection element in a detection direction.

Next, explanation is made on position detection operation for the blur correction lens 211 by the position detection device 213. As shown in FIG. 3(b), there is found, in the nonmagnetic region NM between the N and S poles of the magnet 213a just under the magnetic detection element 213b, a position in which the magnetic field intensity in the direction of detection is zero. The output of the magnetic detection element 213b when the magnetic field intensity in the direction of detection is zero is taken as a standard. Based on a difference between outputs of the magnetic detection elements 213b, the position detection device 213 detects the position of the magnet 213a fixed to the movable member 23, that is, the position of the blur correction lens 211 in the direction of detection of position. FIG. 4 is a graph illustrating the relationship between the position in the direction of detection and the output of the magnetic detection element 213b when the magnet 213a is displaced relatively to the magnetic detection element 213b along the designed ideal route (position detection route). The ideal route in design runs along the direction of detection of position through the center of each of the N and S poles of the magnet 213a in the direction of non-detection. Use of the region represented by the approximately linear line on the graph shown in FIG. 4 as a position detection region enables the detection of position to be performed in high accuracy with respect to the direction of detection of position. Note that as far as output characteristics are obtained with reproducibility, the graph representing the relationship between the position of the direction of detection of position and the output of the magnetic detection element does not have to be approximately linear.

Figure 5:
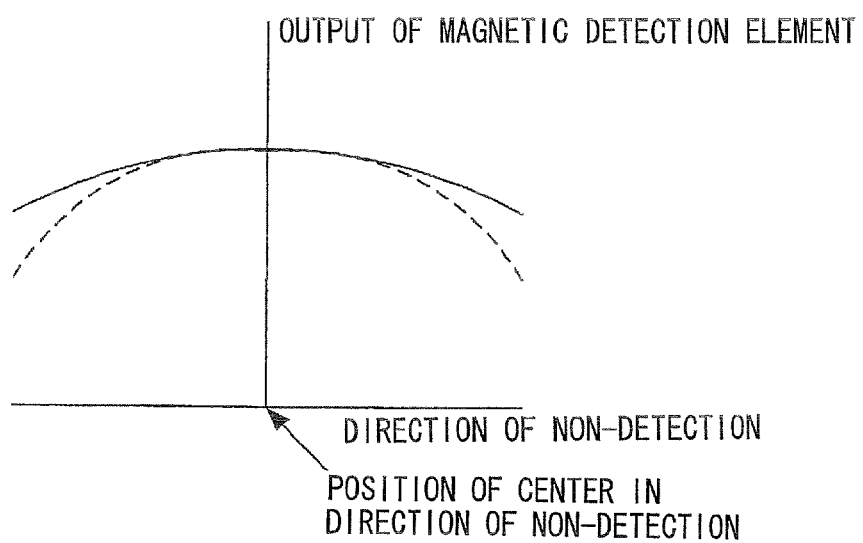
FIG. 5 is a graph illustrating output characteristics of a magnetic detection element in a non-detection direction.

Then, explanation is made on the case where the blur correction lens 211 is moved relative to the stationary member 22 in the direction of non-detection, which is orthogonal to the direction of detection of position. Since the magnet 213a is of a definite size, the magnetic detection element 213b is susceptible to an influence due to a variation in magnetic field in the direction of non-detection, which is diagonal to the direction of detection of position. The variation of magnetic field in the direction of non-detection is represented by a parabolic curve in solid line or in broken line as shown in FIG. 5. For this reason, the larger the displacement of the magnetic detection element 213b in the direction of non-detection is, the severer the influence of the displacement on the detection signal is, thereby forming an error component.

Accordingly, in the position detection device 213 according to the first embodiment, the above-mentioned trapezoidal nonmagnetic regions NMa and NMb are provided substantially in the center of the N and S poles, respectively, in order to decrease the magnetic field intensity in the direction of detection of position and provide the effect of averaging the distribution of magnetic field intensity in the direction of non-detection. That is, the nonmagnetic regions NMa and NMb are provided so as to lower a change in amount of detected magnetism detected by the magnetic detection element 213b when the magnet 213a is displaced in the direction of non-detection. Due to this effect, as indicated by the solid line in FIG. 5, the output of the magnetic detection element 213b in the direction of non-detection is smoothed in the vicinity of a position in the direction of non-detection where the magnetic field intensity in the direction of detection is zero. Note that the broken line in FIG. 5 indicates the output of the magnetic detection element 213b in the direction of non-detection when the nonmagnetic regions NMa and NMb are not provided substantially in the center of each of the N and S poles of the magnet.

Figure 6:
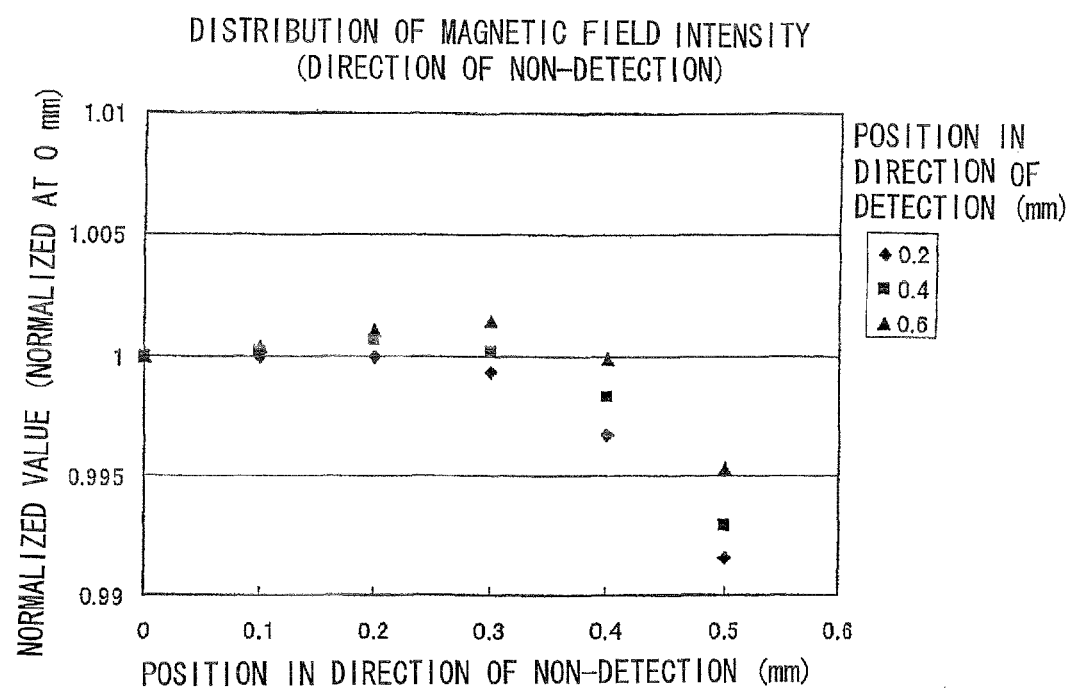
FIG. 6 is a graph illustrating output characteristics of a magnetic detection element in a non-detection direction when a non-magnetic portion substantially in the center of each of N and S poles is of a substantially trapezoidal form.

Simulation has been performed by using the position detection device 213 including components whose sizes were set as follows and the results of the simulation are shown in FIG. 6.

(1) Thickness of the magnet 213a: 1.0 mm;
(2) Length of the magnet 213a in each direction of detection: 1.65 mm;
(3) Length of the magnet 213a in the direction of non-detection: 3 mm;
(4) Width of nonmagnetic region NM: 1.3 mm;
(5) Widths of nonmagnetic regions NMa and NMb on the side of the center of the magnet 213a: 0.3 mm;
(6) Widths of nonmagnetic regions NMa and NMb on the side of the outer end of the magnet 213a: 0.1 mm; and
(7) Clearance between the magnet 213a and the magnetic detection element 213b: 1.0 mm.

FIG. 6 is a graph illustrating the relationship between the output and the position in the direction of the magnetic detection element 213b, with the values of positions of 0.2 mm, 0.4 mm, and 0.6 mm in the direction of detection normalized according to the position of 0 m in the direction of non-detection using the position in the center in the direction of detection as a standard. In the position of 0.4 mm in the direction of non-detection, normalized values in the positions of 0.2 mm and 0.6 mm in the direction of detection are 0.996753 and 0.999871, respectively, and the ratio of the latter to the former is 1.0031 (0.31%).

Figure 7:
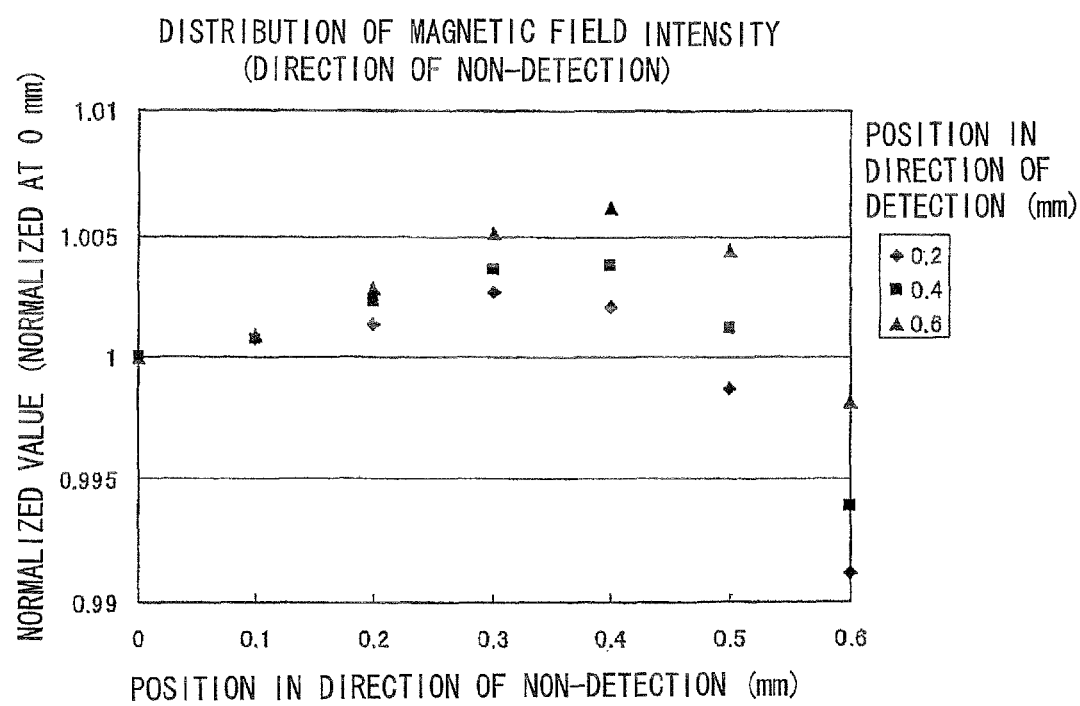
FIG. 7 is a graph illustrating output characteristics of a comparative example.

FIG. 7 is a graph illustrating the characteristics of the position detection device according to a comparative example. In the position detection device according to the comparative example, the widths of the nonmagnetic regions NMa and NMb arranged substantially in the center of the N and S poles of the magnet 213a is set to a constant value of 0.2 mm. This is similar to the position detection device according to a second embodiment of the present invention (see FIG. 12) detailed hereinbelow.

As shown in FIG. 7, in the position detection device according to the comparative example, the normalized values at 0.2 mmm and 0.6 mm in the direction of detection in the position of 0.4 mm in the direction of non-detection are 1.002024 and 1.006201 and the ratio of the latter to the former is 1.041685 (0.42%). Since, in the position detection device 213 of the first embodiment, the ratio of the normalized values is 1.0031 (0.31%), the compensation of error in the present embodiment is improved by about 75% as compared with the comparative example.

That is, when the widths of the nonmagnetic regions NMa and NMb are constant, the effect of averaging the distribution of magnetic field intensity in the direction of non-detection becomes overmuch as shown in FIG. 7 as the displacement in the direction of detection is increased. As a result, with an increase in displacement in the direction of detection, the error component of the output signal of the magnetic detection element 213b increases as the displacement in the direction of non-detection increases.

In the first embodiment, the error in detection of position due to a shift in the direction of non-detection is reduced as follows. That is, with an increase in displacement in the direction of detection, a degree of averaging the distribution of magnetic field intensity in the direction of non-detection is decreased. In other words, the position detection device 213 is configured such that with an increase in displacement in the direction of detection, the magnetic field intensity in the direction of detection is increased. For this purpose, the nonmagnetic regions NMa and NMb substantially in the center of the N and S poles are each made trapezoidal. As a result, as shown in FIG. 6, a change in output when the displacement occurs in the direction of non-detection in each position in the direction of detection, that is, a variation in the value of error component is controlled.

As mentioned above, the output generated when a displacement in the direction of non-detection which would become an error component in the direction of detection of position occurs is controlled or restricted to approximately the same value in any position in the direction of detection. This enables detection of position with less error and with high precision in the direction of detection of position. The reason why the above-mentioned comparative example exhibits the effect as compared with the position detection device that is not provided with nonmagnetic regions will be described later on.

The position detection device of the present invention is not limited to the one according to the first embodiment and may be modified as follows. Further, in second to fourth embodiments detailed hereinbelow, the following modifications can be made similarly.

Figure 8:
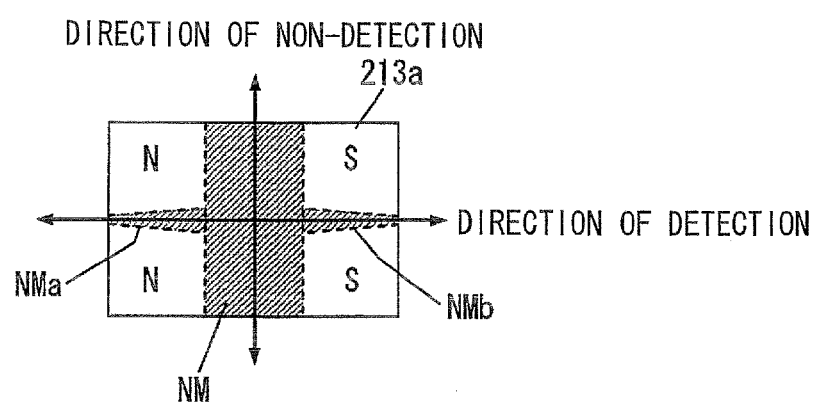
FIG. 8 is a diagram illustrating a modification of the position detection device according to the first embodiment.

(1) In the first embodiment, the nonmagnetic region substantially in the center of each of the N and S poles is of a trapezoidal form, the form of the nonmagnetic region is not limited thereto. The nonmagnetic regions NMa and NMb may assume any form as far as the width thereof is gradually narrowed with an increase in displacement in the direction of detection; for example, it may be in the form of a wedge as shown in FIG. 8. Further, as shown in FIGS. 9(a) and 9(b), it may be in the form of a plurality of rectangles arranged such that the farther the position of the rectangle is in the direction of from the center of the magnet 213a toward the outer end of the magnet 213a, the more the size of the rectangle is stepwise decreased. In addition, at least one of the nonmagnetic regions provided in the N and S poles may be formed in the form of, for example, a trapezoid or a wedge.

(2) In the first embodiment, explanation has been made that substantially the center of each of the N and S poles of the magnet 213a is a nonmagnetic region that has not been magnetized. However, the structure of this portion may be configured such that a pair of magnets each provided with a notch of predetermined form in the magnetization region are arranged in line symmetry with respect to the ideal route in design. Alternatively, one magnet may be polarized into four magnetic portions or four independent magnetic portions (magnetic bodies) may be combined to constitute the position detection device 213. When four independent magnetic bodies are used, nonmagnetic bodies made of, for example, plastic or copper as nonmagnetic regions NM, NMa, or NMb are sandwiched by the magnetic bodies to form the position detection device 213.

Figure 10:
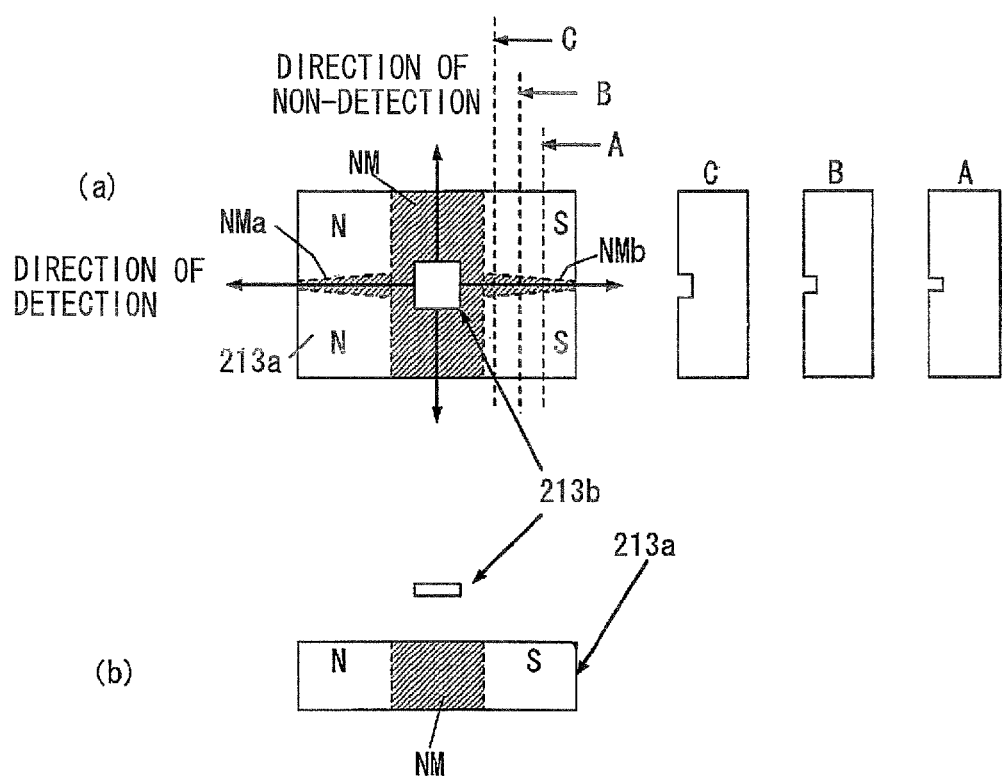
FIGS. 10(a) and 10(b) show another modification of the position detection device according to the first embodiment, with FIG. 10(a) being a plan view while FIG. 10(b) being a cross-sectional view.
Figure 11:
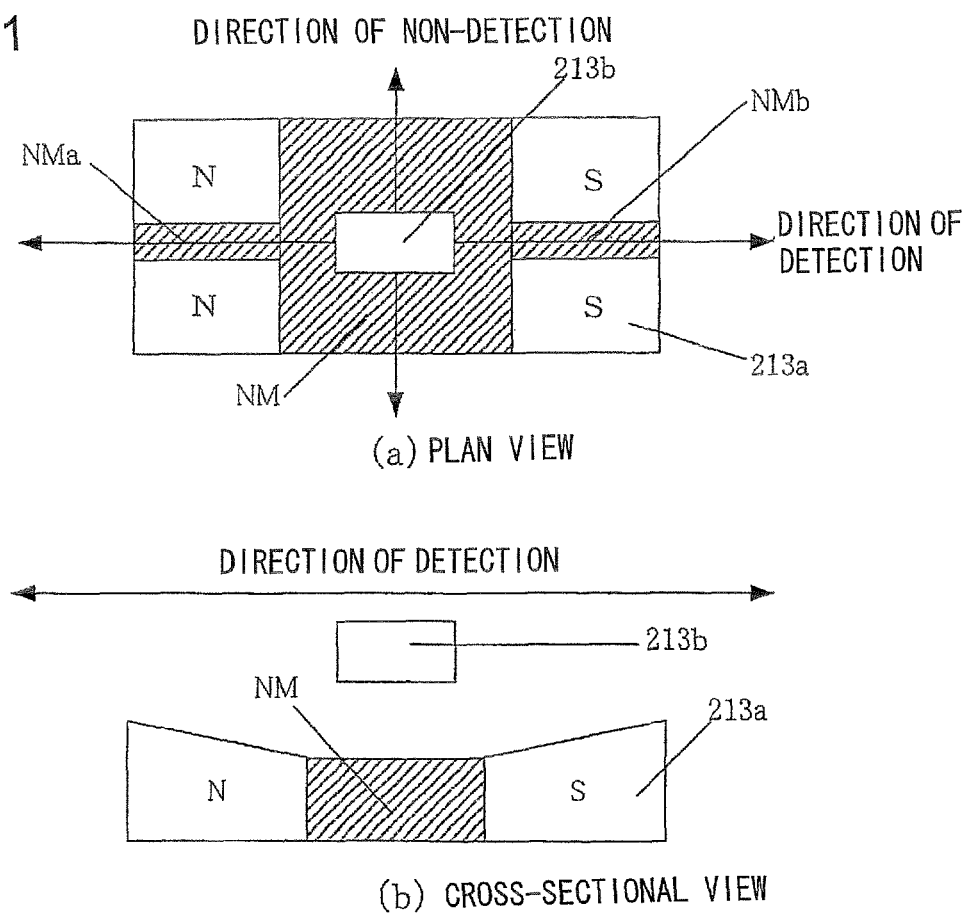
FIGS. 11(a) and 11(b) show another modification of the position detection device according to the first embodiment in which a magnet is sloped in the direction of detection of position, with FIG. 11(a) being a plan view while FIG. 11(b) being a cross-sectional view.
Figure 13:
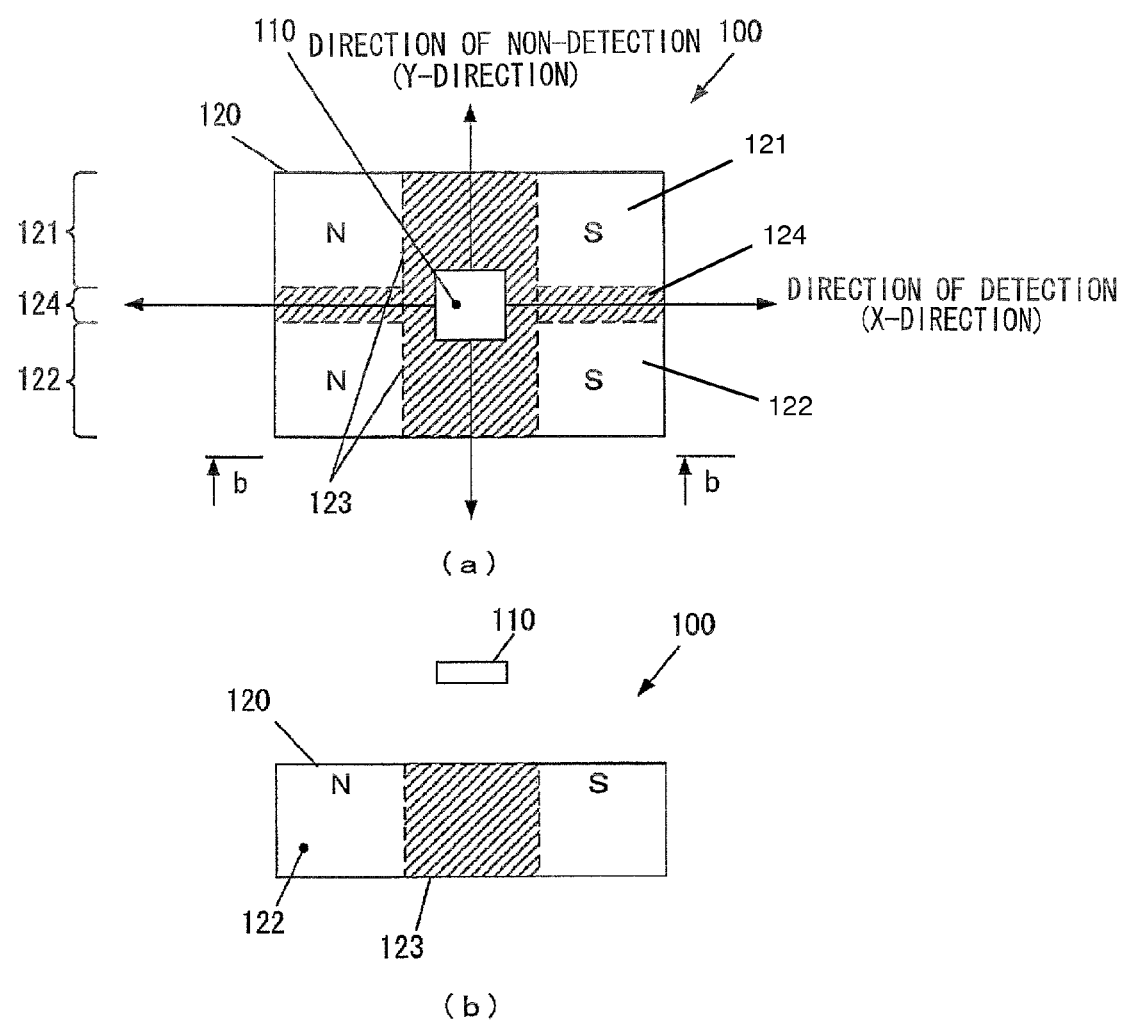
FIGS. 13(a) and 13(b) show a plan view and a b-b arrow view, respectively, of the position detection device according to the second embodiment.

(3) In the explanation on the first embodiment, substantially the center of each of the N and S poles of the magnet 213a is a nonmagnetic region. However, this region may be a low magnetism region. That is, substantially the center of each of the N and S poles of the magnet 213a is provided with a recess of a predetermined form to make a low magnetism region having a low magnetic field intensity. To be concrete, as shown in, for example, FIGS. 10(a) and 10(b), a groove is formed as a low magnetism region in the vicinity of the center of the magnet 213a in the direction of non-detection. As shown in cross-sections A-A, B-B, and C-C in FIG. 10(a), the width of the groove becomes narrower as the cross-section gets away from the nonmagnetic region NM along the direction of detection. Note that the groove may be designed such that the walls of the groove are sloped. Alternatively, as shown in FIGS. 11(a) and 11(b), the low magnetism region may be formed by making a cross section of the magnet 213 to be sloped in the direction of detection of position, so that the magnetic field intensity can increase with an increase in displacement in the direction of detection of position. That is, the low magnetism region is a region in which magnetism lower than that of the N and S poles of the magnet 213a is generated.

(4) In the explanation on the first embodiment, the magnet 213a is fixed to the movable member 23 and the magnetic detection element 213b is fixed to the stationary member 22. However, the magnetic detection element 213b may be fixed to the movable member 23 and the magnet 213a may be fixed to the stationary member 22.

(5) As the magnetic detection element 213b, an element that generates an output in response to magnetic field intensity may be used, such as a Hall element or a magneto-resistance effect element.

(6) The size of each component element in the position detection device 213 is not limited to the above-mentioned values.

(7) In the explanation on the first embodiment, explanation has been focused on the example in which the position detection device 213 of the present invention is utilized for a blur correction lens of a camera. However, the present invention should not be construed as being limited to this example but the present invention can be utilized in detection of position of any moving body. That is, the present invention can be applied to any position detection device that detects the moving position of a moving body with high precision, the moving position of which could vibrate from the axis of detection of position to another axis other than the axis of detection of position. For example, the position detection device 213 can be utilized in an optical apparatus other than a camera; for example, it can be utilized in a binocular, a telescope, and a field scope. Also, the position detection device 213 can be utilized in a compact camera, with the lens barrel integrated with the camera body.

(8) In the explanation on the first embodiment, explanation has been focused on the two dimensional directions of detection of position. However, the present invention is also applicable to a position detection device that detects only in a single direction of detection.

Second Embodiment

Hereinafter, referring to FIGS. 12 to 19, a position detection device according to a second embodiment of the present invention is explained. FIGS. 12(a) and 12(b) are schematic diagrams showing the construction of the vibration compensation apparatus including the position detection device according to the second embodiment, illustrating a state of the vibration compensation apparatus as seen in the direction of the optical axis. The position detection device according to the second embodiment includes a magnet that moves parallel to a Hall element. The magnet is provided with a plurality of magnetized regions each of which has an N pole and an S pole arranged in the direction of detection and is disposed at a distance in the direction of non-detection that is perpendicular to the direction of detection. In each space between the adjacent magnetized regions, there is arranged a non-magnetized region.

As shown in FIGS. 12(a) and 12(b), the vibration compensation apparatus 1 includes a blur correction lens group 2, a movable lens frame 3, an X-direction actuator 4, a Y-direction actuator 5, an X-direction position detection device 100, and a Y-direction position detection device 200. Note that FIG. 12(a) shows a state in which an optical axis of a blur correction optical system (including the blur correction lens group 2 and the movable lens frame 3) of the vibration compensation apparatus 12 coincides with an optical axis I of the lens barrel 20 (see FIG. 1) in which the blur correction optical system is accommodated. FIG. 12(b) shows a state in which the blur correction optical system is shifted downward, i.e., in the Y-direction, so that the optical axis of the blur correction optical system and the optical axis I of the lens barrel 20 are out of alignment with each other. Note that "optical axis I" means an optical axis of an optical system that is accommodated in the lens barrel 20 other than the vibration optical system.

The vibration compensation apparatus 1, as in the first embodiment above, is arranged in, for example, the interchangeable lens barrel 20 of a camera. Based on the vibration of the camera detected by the gyroscopes 11X and 11Y, the vibration compensation apparatus 1 drives the X-direction actuator 4 and the Y-direction actuator 5 to displace the blur correction lens group 2, thereby decreasing image blur on an image forming surface of the image sensor 30. Hereinafter, explanation is focused on differences of the present embodiment from the first embodiment.

The blur correction lens group 2 is a lens group that constitutes a part of a photographic optical system that is accommodated in the lens barrel 20. The blur correction lens group 2 is moved in two directions perpendicular to the optical axis, that is, in the X-direction and Y-direction, thereby improving image blur on the image forming surface of the image sensor 30. The movable lens 3 is a lens support frame and on its inner diameter side, the blur correction lens group 2 is fixed. The movable lens frame 3 is supported by a movable lens group supporting mechanism (see FIGS. 1(a) and 1(b)) such that it is movable along a plane perpendicular to the optical axis relative to the lens barrel 20.

The X-direction actuator 4 and the Y-direction actuator 5 are each provided with a voice coil motor and drive the movable lens frame 3 in corresponding directions. Note that the X-direction and the Y-direction indicate directions of movement of the blur correction lens group 2 upon blur correction to yawing and pitching, respectively, when the camera is used in a horizontal position (upon ordinary photographing). The X-direction is a horizontal direction upon ordinary photographing by the camera and the Y-direction is an up-and-down direction (vertical direction). The X-direction actuator 4 and the Y-direction actuator 5 include respective coil units which are fixed to a periphery of the movable lens frame 3 at a position horizontally away from the optical axis of the blur correction lens group 2 in the horizontal and at a position below the optical axis of the blur correction lens group 2, respectively.

The X-direction position detection device 100 and the Y-direction position detection device 200 detect positions of the movable lens frame 3 in the X-direction and the Y-direction, respectively. The X-direction position detection device 100 and the Y-direction position detection device 200 are located on opposite sides to the X-direction actuator 4 and the Y-direction actuator 5, respectively, with respect to the optical axis of the blur correction lens group 2. The X-direction position detection device 100 and the Y-direction position detection device 200 include magnetic detection units 110 and 210, respectively, as well as magnets 120 and 220, respectively.

The magnetic detection units 110 and 210 include each a magnetic field intensity sensor fixed to the barrel side of the lens barrel 20, for example, to the stationary member 22 (see FIG. 2(a)). The magnetic field intensity sensor includes a Hall element that generates an output voltage corresponding to a magnetic flux density of the detection unit and detects a magnetic field in the direction normal to a surface of each of the magnetic detection units 110 and 210.

The magnets 120 and 220 are those obtained by subjecting a magnetic body made of, for example, an iron-based metal to magnetization. The magnets 120 and 220 are relative motion units that are fixed to the periphery of the movable lens frame 3 and follow the displacement of the movable lens frame 3 to move relative to the corresponding magnetic detection units 110 and 210, respectively, along a plane perpendicular to the optical axis.

Note that the X-direction position detection device 100 and the Y-direction position detection device 200 are arranged such that their directions of detection are substantially perpendicular to each other. Therefore, when the movable lens frame 3 is displaced in the Y-direction as shown in FIG. 12(b), the magnet 120 in the X-direction position detection device 100 will move in the direction of non-detection to the magnetic detection unit 110.

FIGS. 13(a) and 13(b) are enlarged views of the X-direction position detection device 100. FIG. 13(a) is an enlarged view of the portion II in FIG. 12(a). FIG. 13(b) is a cross-section on arrows b-b of FIG. 13(a). Note that in FIG. 13(a), the horizontal direction indicates the X-direction, which is the direction of detection and the vertical direction indicates the Y-direction, which is the direction of non-detection. As shown in FIG. 13(a), the magnet 120 has a planar shape of a rectangle as seen from the direction of the optical axis such that one pair of sides thereof is substantially parallel to the X-direction and another pair of sides thereof is parallel to the Y-direction. Further, as shown in FIG. 13(b), the magnet 120 has a surface facing the magnetic detection unit 110 and a surface opposite thereto, both the surfaces being formed substantially planar. The surface of the magnet facing the magnetic detection unit 110 is arranged parallel to the X-direction and the Y-direction. This makes constant the distance between the magnet 120 and the magnetic detection unit 110 when the magnet 120 moves following the movement of the movable lens frame 3.

The magnet 120 includes a pair of magnetized regions 121 and 122, each having an N pole and an S pole arranged as separated in the X-direction, and arranged parallel to each other as separated in the Y-direction. In each of the magnetized regions 121 and 122, the orientation of N and S poles (orientation of magnetization) is unified. Further, in each of the magnetized regions 121 and 122, a nonmagnetized region 123 is formed between the N and S poles having a residual magnetic flux density that is negligibly low. The magnet 120 is provided with a nonmagnetized region 124 that is arranged between the magnetized regions 121 and 122, extends in the X-direction in the form of a strip, and has a residual magnetic flux density that is negligibly low. The residual magnetic flux density refers to a magnetic flux density that remains in the material of the magnetic body itself when an external magnetic field is removed.

Then, the magnetic detection unit 110, in a state where the optical axis of the blur correction lens group 2 coincides with the optical axis of the lens barrel 20 (in a centered state), is arranged with respect to the magnet 120 so as to face a region that corresponds to a central part of the nonmagnetized region 124 in the Y-direction and in a central part of the nonmagnetized region 123 in the X-direction. Note that the Y-direction position detection device 200 has the same configuration as that of the x-direction position detection device 100 and is arranged so that the direction of detection coincides with the Y-direction.

Figure 14:
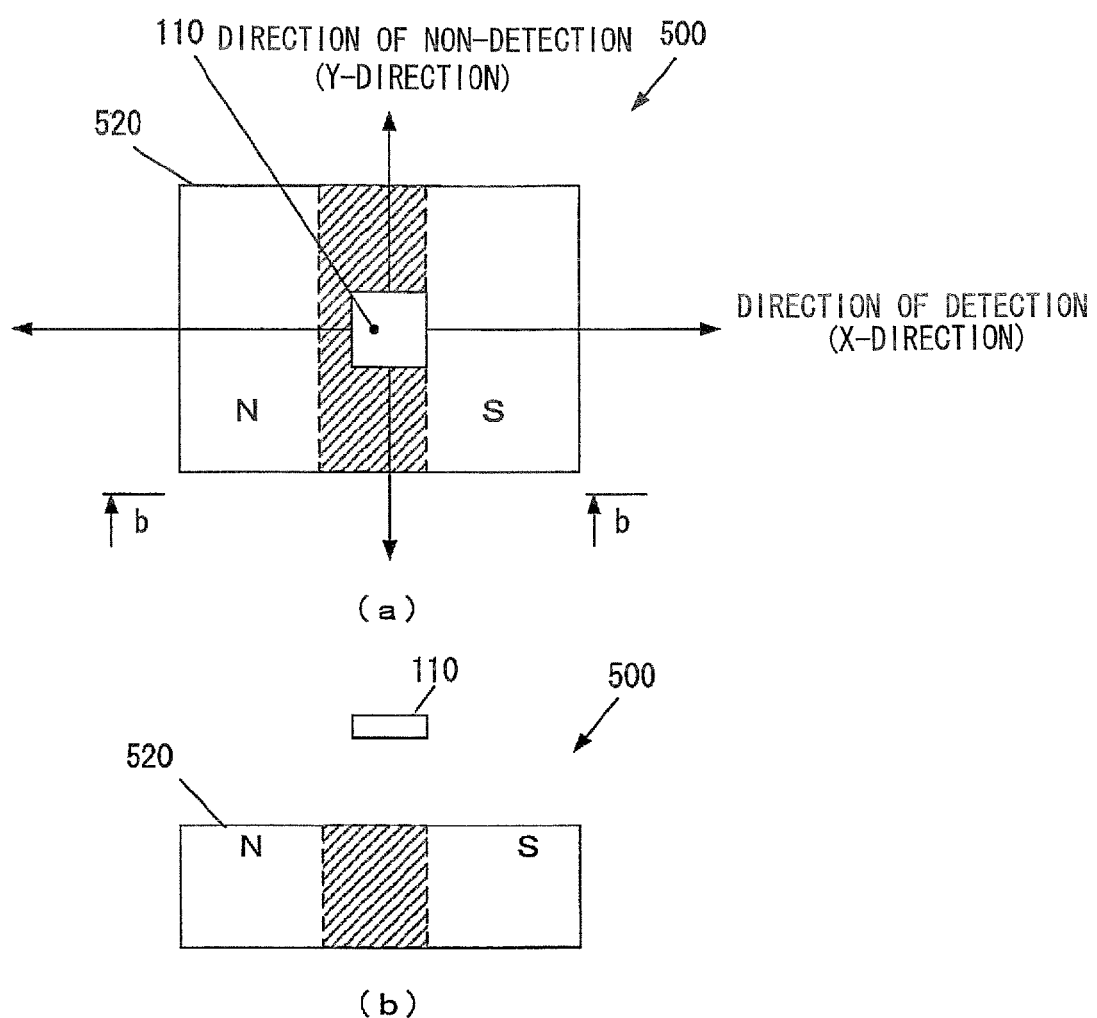
FIGS. 14(a) and 14(b) show a plan view and a b-b arrow view, respectively, of a position detection device according to a comparative example.

Next, explanation is made on the operation and effect of the second embodiment described above in comparison with a comparative example illustrated in FIGS. 14(*a*) and 14(*b*). FIGS. 14(*a*) and 14(*b*) show a plan view and a sectional view illustrating the construction of the position detection device according to a comparative example to the second embodiment. In FIGS. 14(*a*) and 14(*b*), those parts similar to those in the X-direction position detection device 100 described in the second embodiment are indicated by the same reference numerals and description thereof is omitted. Here, explanation is focused on differences from the X-direction position detection device 100.

In a position detection device 500 of the comparative example shown in FIGS. 14(*a*) and 14(*b*), a magnet 520 in the position detection device 500 includes a pair of N and S poles spaced apart in the X-direction. The magnetic detection unit 110, in a state where the optical axis is arranged such that the optical axis of the blur correction lens group 2 coincides with the optical axis of the lens barrel 20, faces an intermediate part between the N and S poles of the magnet 520.

Figure 15:
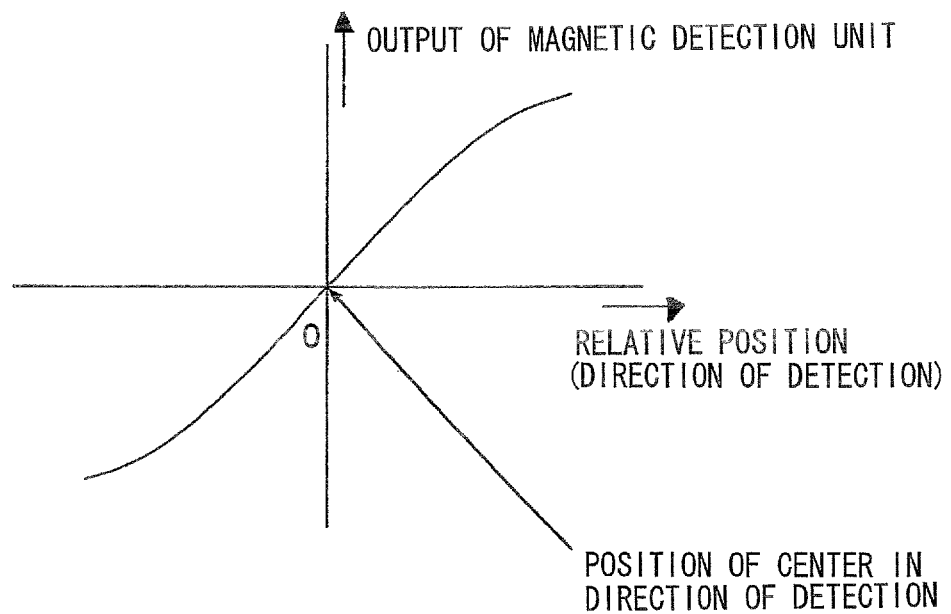
FIG. 15 is a graph illustrating output characteristics of a magnetic detection element in the direction of detection.

FIG. 15 is a graph illustrating an example of an output of the magnetic detection unit 110 versus a position of the magnet 120 in the X-direction (direction of detection) in the X-direction position detection device 100 according to the second embodiment. In FIG. 15, the horizontal axis indicates a relative position of the magnet 120 when a state where the blur correction lens group 2 is centered, that is, a state where the magnetic detection unit 110 is in a central position in the direction of detection, is taken as a standard, and the vertical axis indicates an output of the magnetic detection unit 110.

The output of the magnetic detection unit 110 is 0 when the magnet 120 is in a centered state and increases as an amount of displacement of the relative position of the magnet 120 increases. The polarity of the output is reversed depending on the direction of displacement. Therefore, based on the change in output of the magnetic detection unit 110, the displacement of the magnet 120 with respect to the magnetic detection unit 110 can be detected. Such a relationship between the amount of displacement and the output of the magnetic detection unit 110 is similar in the case of the position detection unit 500 of the comparative example shown in FIG. 14.

Figure 16:
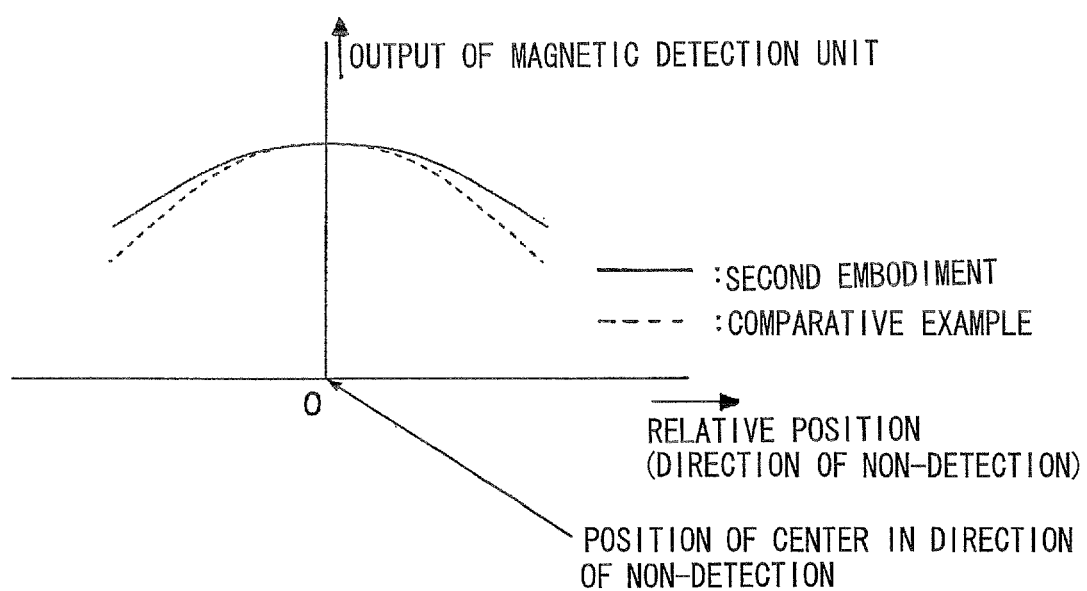
FIG. 16 is a graph illustrating output characteristics of a magnetic detection element in the direction of non-detection.

FIG. 16 is a graph illustrating an example of the relationship between the position of the magnetic detection unit 110 in the Y-direction (direction of non-detection) and the output of the magnetic detection unit 110 for the magnet 120 of the X-direction position detection device 100 according to the second embodiment and the magnet 520 of the position detection device 500 of the comparative example. In FIG. 16, the horizontal axis indicates relative positions of the magnets 120 and 520 in the Y-direction when the blur correction lens group 2 is fixed to a certain position in the X-direction. The vertical axis indicates an output of the detection unit 110. The outputs are normalized using the output at the position of Y=0. Note that in FIG. 16, the curve for the X-direction position detection device 100 according to the second embodiment is drawn by a solid line and the curve for the comparative example is drawn by a broken line.

As shown in FIG. 16, the outputs of the magnetic detection unit 110 are each maximum when the magnets 120 and 250 are not displaced and gradually decrease as amounts of displacement increase. In this manner, even when the magnets 120 and 520 are displaced with respect to the magnetic detection unit 110 in the direction of non-detection, the output of the magnetic detection unit 110 varies, so that an error could occur in detection of position in the direction of detection. However, the X-direction position detection device 100 according to the second embodiment generates a smaller change in output of the magnetic detection unit 110 when it is displaced in the direction of non-detection than the comparative example. On this point, explanation is made in detail hereinbelow.

Figure 17:
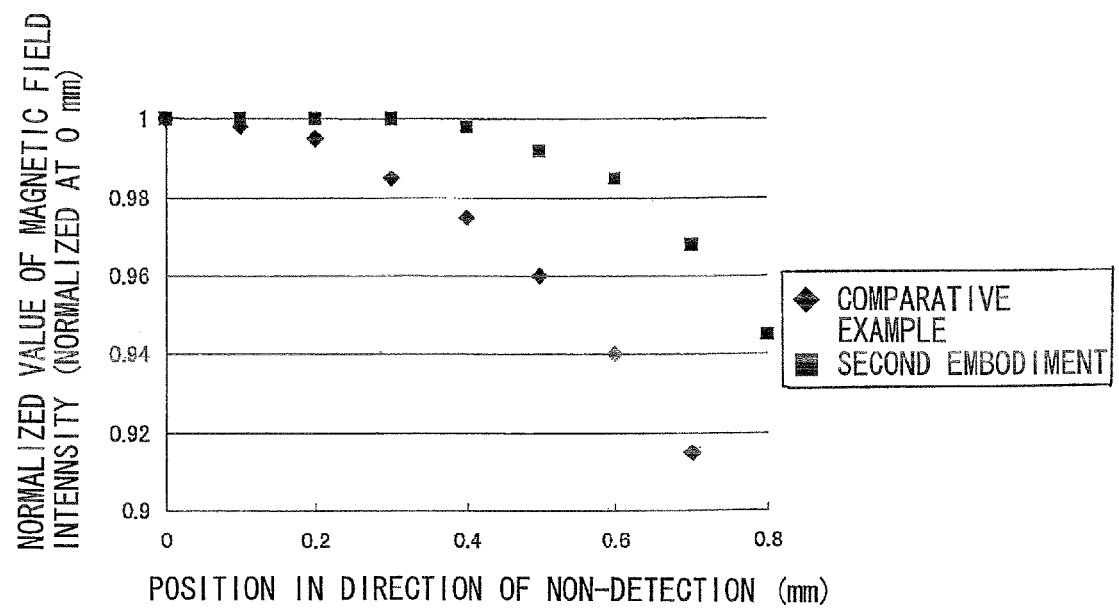
FIG. 17 is a graph illustrating results of simulation on magnetic field intensity in the second embodiment and the comparative example.

FIG. 17 is a graph illustrating positions of the magnet 120 of the X-direction position detection device 100 according to the second embodiment and the magnet 520 of the position detection device 500 of the comparative example and results of simulations of magnetic field intensity. In FIG. 17, the horizontal axis indicates displacements of the magnets 120 and 520 from the state where the blur correction lens group 2 is centered in the Y-direction. The vertical axis indicates normalized magnetic field intensity. Prerequisites for the simulation are as follows.

(1) Thickness of each of the magnets 120 and 520 in the direction of optical axis I of the leans barrel 20: 1.0 mm;

(2) Length of each of the magnets 120 and 520 in the X-direction (direction of detection): 1.65 mm;

(3) Length of each of the magnets 120 and 520 in the Y-direction (direction of non-detection): 3.0 mm;

(4) Distance between N and S poles in the X-direction: 1.0 mm;

(5) Distance of the magnets 120 or 520 and the magnetic detection unit 110: 1.0 mm; and (6) Width of the nonmagnetized region 124 in the Y-direction of the X-direction position detection device 100: 0.2 mm.

FIG. 17 indicates that in the comparative example, when the magnet 520 is displaced by 0.6 mm in the direction of non-detection (Y-direction) from a state where the blur correction lens group 2 is centered in the Y-direction, the magnetic field intensity in the magnetic detection unit 110 decreases by about 6%. This generates an error in detection of position. On the contrary, in the X-direction position detection device 100 according to the second embodiment, even when the magnet 120 moves in the same manner, the decrease in the magnetic field intensity can be controlled to about 1.5%. This can decrease an error in detection of position.

As mentioned above, according to the second embodiment, the nonmagnetized region 124 is arranged that extends along the direction of detection (for example, in the X-direction) between the magnetized regions 121 and 122. This smoothes the distribution of magnetic intensity in the direction of non-detection (Y-direction), so that when the magnet 120 is displaced in the direction of non-detection (Y-direction) with respect to the magnetic detection unit 110, the change in an output of the magnetic detection unit 110 can be controlled. This assures precision in detection by the position detection device.

Third Embodiment

Next, explanation is made on a position detection device according to a third embodiment of the present invention. In the explanation below, the same parts as those of the position detection device according to the second embodiment are indicated by the same reference numerals and explanation thereof is omitted. Here, explanation is focused on differences from the second embodiment.

Figure 18:
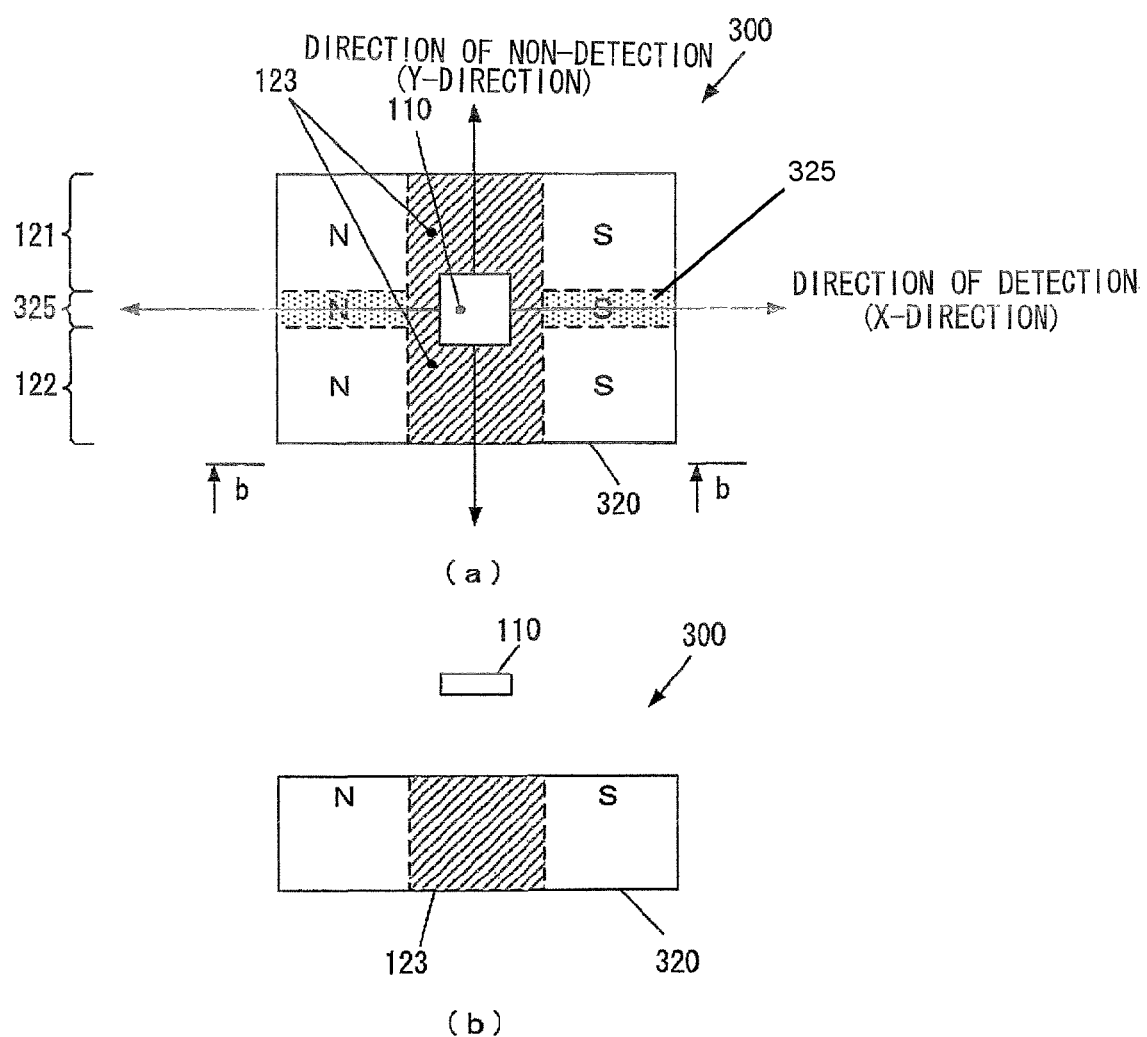
FIGS. 18(a) and 18(b) show a plan view and a b-b arrow view of a position detection device according to a third embodiment of the present invention.

FIGS. 18(*a*) and 18(*b*) are diagrams illustrating the construction of the X-direction position detection device 300 according to the third embodiment. FIG. 18(*a*) is a plan view as seen from the direction of the optical axis I. FIG. 18(*b*) is a b-b arrow view of FIG. 18(*a*). A magnet 320 of the X-direction position detection device 300 includes a low magnetized region 325 instead of the nonmagnetized region 124 in the magnet 120 in the second embodiment. The low magnetized region 325 includes an N pole sandwiched between the N poles of the magnetized regions 121 and 122 and an S pole sandwiched between the S poles of the magnetized regions 121 and 122. The N and S poles of the low magnetized region 325 are set to have lower magnetic flux densities than those of the N and S poles of the magnetized regions 121 and 122 adjacent thereto.

Note that the X-direction position detection device 300 is arranged such that the magnetic detection unit 110 faces a central part of the low magnetized region 325 in the X-direction in a state where the blur correction lens group 2 is centered. A Y-direction position detection device can be constructed similarly to the X-direction position detection device 300.

According to the third embodiment as mentioned above, in addition to the effect as that of the second embodiment, there can be obtained an effect that freedom of adjustment of the distribution of magnetic intensity in the direction of non-detection can be improved by appropriately setting the magnetic flux density of the low magnetized region 325.

Fourth Embodiment

Next, explanation is made on a position detection device according to a fourth embodiment of the present invention. Note that in the following explanation, the same parts as those in the second embodiment are indicated by the same reference numerals and explanation thereof is omitted. Here, explanation is focused on differences from the second embodiment.

FIGS. 19(a)-19(c) are diagrams illustrating a construction of an X-direction position detection device 400 according to the fourth embodiment of the present invention. FIG. 19(a) is a plan view as seen from the direction of an optical axis I and FIGS. 19(b) and 19(c) show a b-b arrow view and a c-c arrow view of FIG. 19(a).

A magnet 420 of the X-direction position detection device 400 includes a pair of poles N and S spaced apart in the X-direction. The N and S poles are provided in a central part of the magnet 420 in the Y-direction. The magnet 420 is provided with a groove 426 formed by depressing a surface thereof facing the magnetic detection unit 110 as a low magnetized region.

The groove 426 extends substantially linear in the X-direction and is arranged substantially in the central part of the magnet 420 in the Y-direction. The above-mentioned N and S poles are arranged on the bottom of the groove 426. As shown in FIG. 19(c), the groove 426 is, for example, rectangular in cross-section, with the cross-sectional shape being substantially the same along the longitudinal direction of the groove 426.

Note that the X-direction position detection device 400 is arranged such that the magnetic detection unit 110 faces substantially a central part between the N and S poles of the magnet 420 in a state where the blur correction lens group 2 is centered. A Y-direction position detection device can be constructed similarly to the X-direction position detection device 400.

According to the fourth embodiment as explained above, in addition to the effect as those of the second and third embodiments, there can be obtained an effect that portions to be magnetized can be reduced, which facilitates production.

The position detection device of the present invention is not limited to the second to fourth embodiments described above, but various variations and modifications can be made thereto and such variations and modifications will be included by the present invention as equivalents.

(1) Although in the second and third embodiments, a nonmagnetized region or a low magnetized region is arranged between a plurality of magnetized regions, the present invention is not limited thereto but the nonmagnetized region and the low magnetized region may be arranged in combination. Further, the nonmagnetized region or the low magnetized region may be provided at least one of the N pole side and the S pole side of the relative motion unit.

(2) The relative motion units including the nonmagnetized region and low magnetized region in the second and the third embodiments, respectively, can be formed by using a magnetic body formed integrally with the magnetized regions on the both sides thereof and applying locally different magnetization thereto in respect of presence or absence of magnetization or degree of magnetization. However, the present invention is not limited thereto, but the relative motion units can be formed by combining magnetic bodies formed separately differing in presence or absence of magnetization or in degree of magnetization or by forming a portion corresponding to the nonmagnetized region with a nonmagnetic material.

(3) Although the position detection device according to the fourth embodiment is provided with a groove rectangular in cross-section extending in the direction of detection as a recess, the form of the recess is not limited thereto but may take other forms. In addition, it would be acceptable to form a recess on only one of the N pole side and the S pole side.

(4) A recess such as the groove in the fourth embodiment may be formed in the relative motion unit in which a nonmagnetized region or a low magnetized region has been formed as in the second and third embodiments.

In the above, various embodiments and modifications have been explained. However, the present invention should not be construed as being limited thereto and other modes are also included in the scope of the present invention.

A position detection device according to the embodiment of the present invention, includes a magnetic generation unit that has: a first magnetism generating section that is provided on one end side along a predetermined direction and generates magnetism; a second magnetism generating section that is provided on another end side along the predetermined direction and generates magnetism of polarity different from that of the first magnetism generating section; and a low magnetism section that is formed in the first magnetism generating section and the second magnetism generating section such that a width of the low magnetism section varies along the predetermined direction to generate magnetism lower than those of the first magnetism generating section and the second magnetism generating section, and a magnetic detection unit that is capable of moving relative to the magnetic generation unit along the predetermined direction and that detects the magnetism generated by the first magnetism generating section and the second magnetism generating section.

It is preferable that the low magnetism section has a width growing narrower as distanced from a portion where the first magnetism generating section and the second magnetism generating section face each other.

The low magnetism section may be formed in a wedge shape.

It is preferable that the low magnetism section is configured to decrease a change in a magnetism detection amount when the magnetic generating unit and the magnetic detection unit are displaced relative to each other in a direction perpendicular to the predetermined direction.

It is preferable that the first magnetism generating section and the second magnetism generating section are arranged spaced apart from each other.

The low magnetism section may be provided in central regions of the first magnetism generating section and the second magnetism generating section in a direction perpendicular to the predetermined direction.

It is preferable that the low magnetism section includes a nonmagnetic body.

The low magnetism section may be a recess formed in the first magnetism generating section and the second magnetism generating section.

It is preferable that the position detection device detects a relative position of a movable unit in the predetermined direction that is interlocked with one of the magnetic generation unit and the magnetic detection unit according to a detection signal output from the magnetic generation unit when the magnetic generation unit and the magnetic detection unit are in a relative movement to each other; the magnetic generation unit and the magnetic detection unit are arranged such that when the magnetic generation unit and the magnetic detection unit are in a relative movement in the predetermined direction on a position detection route designed for the position detection device, the detection signal of the magnetic detection unit varies according to predetermined output characteristics in response to an amount of displacement of the relative movement, and the low magnetism section is arranged such that when the magnetic generation unit and the magnetic detection unit are in a relative movement at any position on the position detection route in a direction perpendicular to the position detection route, an error component value of the detection signal output from the magnetic detection unit is inhibited.

A position detection device according to the embodiment of the present invention, includes a magnetic section that has: a first pole and a second pole arranged spaced apart from each other having a same magnetic polarity; and a third pole and a fourth pole arranged spaced apart from each other having a magnetic polarity different from that of the first pole and the second pole, and a magnetic detection unit that detects magnetism of the first pole, the second pole, the third pole, and the fourth pole, and the first pole faces the third pole, and the second pole faces the fourth pole.

It is preferable in the position detection device according to the embodiment that each of the space between the first pole and the second pole, and the space between the third pole and the fourth pole varies in a direction in which the first pole and the third pole face to each other.

It is preferable that the position detection device according to the embodiment further includes a low magnetism section arranged in the space between the first pole and the second pole and the space between the third pole and the fourth pole, that generates magnetism lower than that of the magnetic section.

It is preferable in the position detection device according to the embodiment that the magnetic detection unit includes one of a Hall element and a magnetoresistance effect element.

A two-dimensional position measuring apparatus according to the embodiment of the present invention includes: two position detection devices according to the embodiment, wherein the two position detection devices are arranged such that a direction of detection of position by one of the two position detection devices and a direction of detection of position by another of the two position detection devices are perpendicular to each other.

An optical apparatus according to the embodiment of the present invention includes: a two-dimensional position measuring apparatus according to the embodiment; and a control unit that performs control using results of measurement by the two-dimensional position measuring apparatus.

A position detection method according to the embodiment of the present invention generates magnetism by a first magnetism generating section provided on one end side along a direction of detection; generates magnetism of a polarity, which is different from a polarity of the magnetism generated by the first magnetism generating section, by a second magnetism generation section provided on another end side along the direction of detection; decreases the magnetism generated by the first magnetism generating section and the second magnetism generating section by a low magnetism section formed in the first magnetism generating section and the second magnetism generating section such that a width of the low magnetism section varies along the predetermined direction; and moves the magnetic detection unit relative to the first magnetism generating section and the second magnetism generating section to detect the magnetism generated by the first magnetism generating section and the second magnetism generating section.

In the position detection method according to the embodiment, the low magnetism section may include a nonmagnetic body.

A position detection device according to the embodiment of the present invention, includes a magnetic generation unit that has: a first magnetism generating section that is provided on one end side along a predetermined direction and generates magnetism; a second magnetism generating section that is provided on another end side along the predetermined direction and generates magnetism of polarity different from that of the first magnetism generating section; and a low magnetism section that is formed in the first magnetism generating section and the second magnetism generating section along the predetermined direction to generate magnetism lower than those of the first magnetism generating section and the second magnetism generating section, and a magnetic detection unit that is capable of moving relative to the magnetic generation unit along the predetermined direction and that detects the magnetism generated by the first magnetism generating section and the second magnetism generating section.

A position detection method according to the embodiment of the present invention generates magnetism by a first magnetism generating section provided on one end side along a direction of detection; generates magnetism of a polarity, which is different from a polarity of the magnetism generated by the first magnetism generating section, by a second magnetism generation section provided on another end side along the direction of detection; decreases the magnetism generated by the first magnetism generating section and the second magnetism generating section by a low magnetism section formed in the first magnetism generating section and the second magnetism generating section along the predetermined direction; and moves the magnetic detection unit relative to the first magnetism generating section and the second magnetism generating section to detect the magnetism generated by the first magnetism generating section and the second magnetism generating section. The low magnetism section may include a nonmagnetic body.

According to the embodiment of the present invention, a position detection device that enables more accurate position detection can be provided.

Obviously, numerous modifications and variations of the present invention are possible in light of the above teachings. It is therefore to be understood that within the scope of the appended claims, the invention may be practiced otherwise than as specifically described herein.

The disclosure of the following priority applications are herein incorporated by reference:

Japanese Patent Application No. 2005-070775 (filed on Mar. 14, 2005); and

Japanese Patent Application No. 2005-310307 (filed on Oct. 25, 2005).

What is claimed is:

1. An optical apparatus comprising:
a two-dimensional position measuring apparatus that comprises two position detection devices which are arranged such that a direction of detection of position by one of the two position detection devices and a direction of detection of position by another of the two position detection devices are perpendicular to each other; and
a controller configured to perform control using results of measurement by the two-dimensional position measuring apparatus, wherein
each of the two position detection devices comprises:
a magnet comprising:
a first pole and a second pole arranged spaced apart from each other having a same magnetic polarity; and
a third pole and a fourth pole arranged spaced apart from each other having a magnetic polarity different from the magnetic polarity of the first pole and the second pole, the first pole facing the third pole, the second pole facing the fourth pole; and
a magnetic detector configured to detect magnetism of the first pole, the second pole, the third pole, and the fourth pole.

2. A position detection device that detects a position in a first direction, comprising:
a magnet comprising:
a first magnetism generator provided on one end side along the first direction to generate magnetism, and
a second magnetism generator provided on another end side along the first direction to generate magnetism, a polarity of the magnetism by the second magnetism generator being different from a polarity of the magnetism generated by the first magnetism generator, the first magnetism generator and the second magnetism generator being arranged in a plane extending in the first direction; and
a magnetic detector movable relative to the magnet along the first direction and being arranged spaced apart by a predetermined clearance from the plane formed by the first magnetism generator and the second magnetism generator, and configured to detect each of the magnetism generated by the first magnetism generator and the second magnetism generator, wherein
each of the first and second magnetism generators comprises two magnetism generating sections having the same magnetic polarity and facing each other in a second direction perpendicular to the first direction and a low magnetism section formed between the two magnetism generating sections spreading along the first direction to generate magnetism lower than the two magnetism generating sections.

3. A position detection method comprising:
generating magnetism by a first magnetism generator provided on one end side along a first direction which is a direction of detection;
generating magnetism by a second magnetism generator provided on another end side along the first direction, a polarity of the magnetism by the second magnetism generator being different from a polarity of the magnetism generated by the first magnetism generator, the first magnetism generator and the second magnetism generator being arranged in a plane extending in the first direction;
decreasing the magnetism generated by each of the first magnetism generator and the second magnetism generator by a low magnetism section formed in each of the first magnetism generator and the second magnetism generator between two magnetism generating sections having the same magnetic polarity and facing each other in a second direction perpendicular to the first direction, the low magnetism section being formed along the first direction; and
moving the magnetic detector relative to the first magnetism generator and the second magnetism generator to detect the magnetism generated by each of the first magnetism generator and the second magnetism generator, the magnetic detector being arranged spaced apart by a predetermined clearance from the plane formed by the first magnetism generator and the second magnetism generator.

4. The optical apparatus according to claim 1, wherein each of a space between the first pole and the second pole and a space between the third pole and the fourth pole varies in the direction of detection.

5. The optical apparatus according to claim 1, further comprising:
a low magnetism section arranged in each of the space between the first pole and the second pole and the space between the third pole and the fourth pole to generate magnetism lower than the magnetism of the first pole, the second pole, the third pole, and the fourth pole.

6. The optical apparatus according to claim 1, wherein the magnetic detector includes one of a Hall element and a magnetoresistance effect element.

7. The optical apparatus according to claim 1, wherein the magnet further comprises a region that generates magnetism lower than the magnetism of the first pole, the second pole, the third pole, and the fourth pole, the region being arranged between a first region where the first pole and the second pole are arranged, and a second region where the third pole and the fourth pole are arranged.

* * * * *